United States Patent Office 3,171,385
Patented Mar. 2, 1965

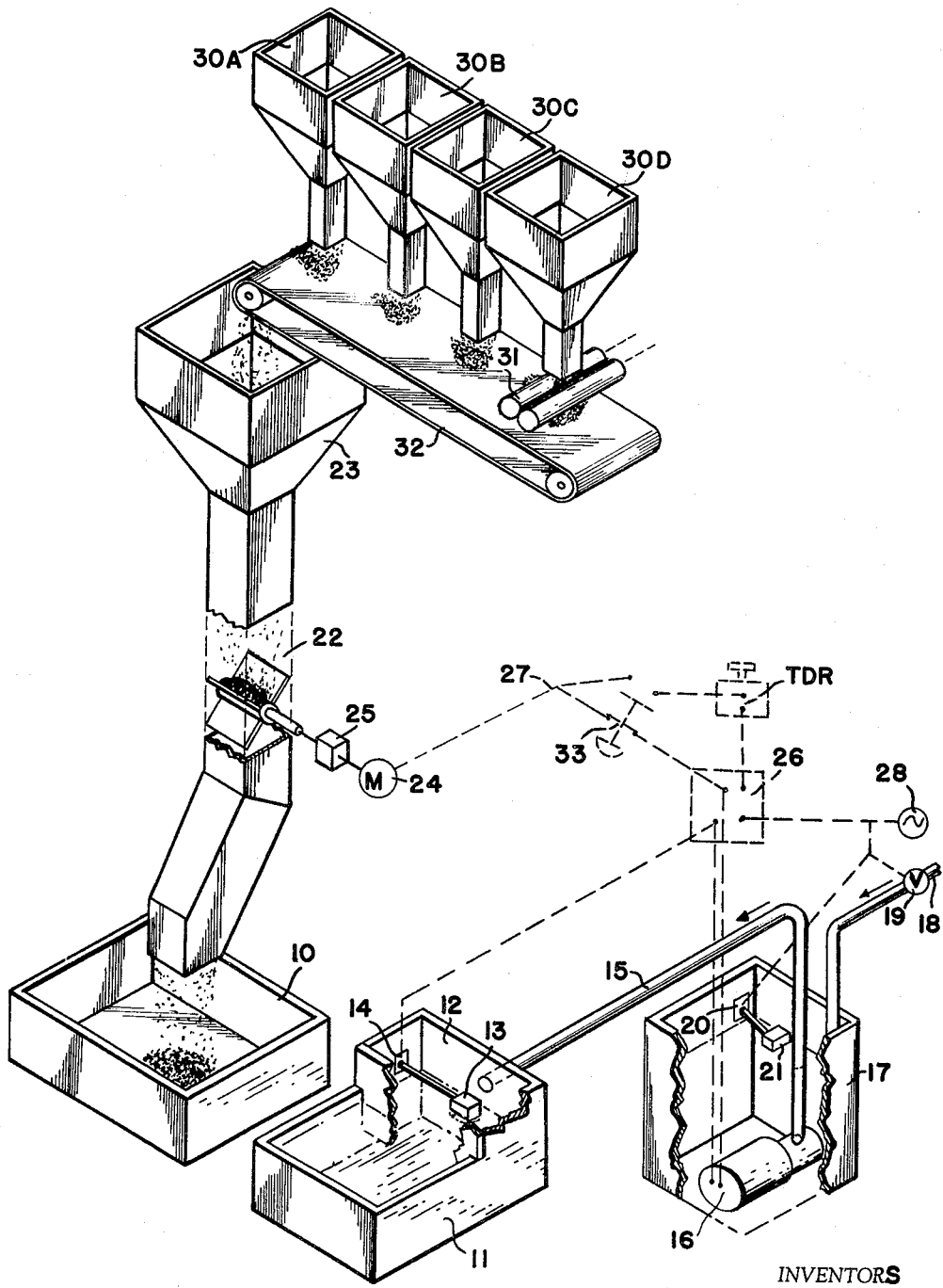

3,171,385
METHOD AND APPARATUS FOR FEEDING AND WATERING ANIMALS
Emmet E. Decker, Youngstown, and Charles H. Mercer, Canfield, Ohio, and Gordon H. Strite, Belleville, Ill., assignors to Chemgo Industries, Inc., Canfield, Ohio
Filed Dec. 8, 1961, Ser. No. 158,005
10 Claims. (Cl. 119—51.11)

This invention relates to animal husbandry, and more particularly to improved method concepts for feeding and watering animals and to improved apparatus for implementing these concepts.

Investigation has shown that for any particular animal of a dairy herd milk and butter fat production is only minutely raised in quantity when the animal is fed far beyond the minimum digestible nutrient value required by the animal to maintain its weight and well-being. Our studies have shown that substantial economies can be effected, without loss of total production and without damage to any animal, by feeding a dairy herd in such manner that each animal normally receives only enough concentrated food to maintain its weight and well-being and to provide for the conversion into milk and butter fat, whatever the quantity of this output might be for the individual animal.

Our concept and method is based on the observation that a milk-producing cow normally desires water in an amount approximately proportional to the weight of its product, it being well recognized that when in lactation the animal will consume water far in excess to that otherwise required merely to maintain its weight and well-being. We have therefore devised a system in which the concentrated nutrients offered to the individual animals of a dairy herd is metered out in accurate proportion to the quantity of water consumed by the animal.

A further object of the invention is the provision of practical apparatus for carrying out the concept and method outlined above, and an ancillary object of the invention is the provision of such apparatus which is entirely operative in an automatic manner to feed an unsegregated herd. This latter object is quite advantageous because the heretofore known methods and apparatus for concentrated nutrient feeding required the feeding to take place in the milking parlor—necessitating at least some manual work and lengthy time utilization of the parlor.

The above and other objects and advantages of the invention will become apparent upon consideration of the following specification and the accompanying drawing wherein there is illustrated a preferred embodiment of the invention.

The sole figure of the drawing is a perspective view, mostly in schematic outline and with parts broken away for clarity, of an automatic feeding and watering station constructed in accordance with the teachings of our invention, and capable of being used to feed and water the animals of an unsegregated dairy herd.

In accordance with the preferred and illustrated embodiment of the apparatus of our invention, we provide an open-topped feed box 10 and an open-topped water container 11 which are arranged in side-by-side relation and, in actual practice, are mounted at proper height for ready access by the cattle. The rear portion of the container 11 has a float compartment 12 in which is mounted a pivoted float 13 operating a switch 14. Compartment 12 is normally covered and thus inaccessible to the animals. For a purpose to be later described, the switch 14 is of the kind which opens when the float 13 rises to the full water level in the container 11 but which does not close until the water level drops to a preselected elevation. In actual practice we have found that a simple two-pole mercury switch with a lost-motion connection to the float arm is well suited for this purpose.

Water is supplied to the container 11 by a conduit 15 leading from an electric pump 16 submerged in a sump or reservoir 17. This sump receives water from a supply conduit 18 in which is placed a solenoid valve 19 under the control of a switch 20 operated by float 21. The arrangement is such that the water level in the sump 17 is maintained at a fairly constant elevation regardless of whether or not the pump 16 is running and also regardless of the variation of pressure which may occur in the supply conduit 18. Further, the level of the water in the sump 17 is well below the high point of the conduit 15 so that the small pump 16 must operate against a fixed head and thus require a fixed period of time to deliver the quantity of water required to move the float 13 from "switch-on" position to "switch-off" position.

It should be apparent from the above description that mere infrequent sipping of the water in the container 11 will not energize the pump 16 but that once the switch 14 is energized the pump 16 will continue to run until the upper water level in container 11 is reached. If, during this interval an animal is drinking from the container 11, the pump will continue to run for a longer period of time. This total interval of time between the closing and opening of the switch 14 is utilized, in accordance with the preferred embodiment of our invention, to control the amount of feed which is deposited in the box 10. The longer pump 16 runs, the more feed is deposited. This feed quantity control may be effected in a number of different ways, but in the illustrated embodiment we have shown schematically a feeding device 22 which is fed from a storage hopper 23, and which discharges into the box 10 as shown. The feeder 22 is driven by a motor 24 through a gear reducer 25 and the operation is such that the amount of feed discharged is proportional to the running time of the motor 24. Through a suitable relay 26 or other connection and the supply wires 27 the motor 24 is energized from a suitable source 28 during all the time that the switch 14 is closed and the pump 16 is running.

While forming no particular part of this invention, and merely to complete the disclosure, we have shown schematically a feed mixing and supply assembly for depositing the desired mixed feed in the hopper 22. This assembly may comprise storage hoppers 30A, 30B, 30C, and 30D to supply, for example, oats, soybeans, prepared supplement and shelled corn under automatic control, not shown, and crushing rolls such as shown at 31 may be employed at the exit chutes of certain of these hoppers, particularly the one containing corn. In a representative installation of a feed supply assembly, the ingredients discharging from the hoppers 30A–D and through the rolls 31 may fall onto a conveyor 32 which discharges into the feeder hopper 23. The conveyor 32 as well as the discharge from the hoppers 30A–D are normally, in actual practice, automatically controlled to maintain a predetermined level of the mixed feed in the hopper 23.

Considering now the operation of the combined apparatus above described, it should be first noted that the adjacent feed box 10 and watering device 11 may be positioned in any suitable congregating location for the herd— in the loafing barn, for example. Normally the box 10 is empty while the water container 11 is filled. If a particular animal desires food it must first drink a predetermined amount of water from the container 11 to start the feeder 22 and if the animal is a low milk producer, it may drink only the amount of water needed to start the feeder 22— at which time it will be attracted to the feed coming into the box 10 and consume the same. The feed rationed to this particular animal will be restricted, however, since the feeder 22 will operate only for the length of time required by the pump 16 to restore the water level in container 11. If the next animal now to appear at the station is a heavy milk producer, it will by nature want to consume much more water from the container 11 and during the latter part of its drinking time when the float 13 may descend far below its "switch-on" position the feeder 22 will begin and continue to run. Also, when the animal starts to feed at box 10, this feeder will continue to operate during all the time necessary to restore the float 13 to its upper level in the container 11. This second animal will therefore receive a much larger ration of concentrated feed as it requires for its much higher production of milk and butter fat. In this manner the feed ration is tailored to the actual total digestible nutrient requirements required by the individual animals, having particular regard to the productivity of the animals. Substantial economies in the administration of dairy herds may thereby be effected.

In some installations of the apparatus of our invention it may be desirable to very easily change the amount of feed furnished in relation to the amount of water consumed as in cases where a herd is subdivided into groups of differing characteristics or where it is desired to vary the feeding of individual animals. This may be readily accomplished, in conjunction with our invention, by providing a variable time delay relay TDR which may be interposed in the energizing circuit 27 for motor 24 by actuation of a switch 33 which may be either automatically or manually controlled. When switch 33 is actuated the direct energizing line between control 26 and motor 24 is disconnected and the relay TDR interposed. Relay TDR operates to energize the motor 24 a predetermined time after the control 26 is activated by switch 14. This delay, of course, decreases the amount of feed which is dispensed following each drinking period of an animal.

In actual practice, the capacity of the pump 16 is so related to the output of feeder 22 that the animals receive feed amounts which have been determined to be optimum in relation to the amount of water consumed. Various types of commercial feeders may be used for the unit 22, and these commonly have controls, not shown herein, whereby the rate of feed discharge may be varied without changing the speed of its drive. Alternately, these units may employ a variable speed drive between their operating motors and their dispensers, and the overall feed proportioning may then be effected by adjusting the ratio of these drives.

It should now be apparent that we have provided an improved method or concept for feeding farm animals, particularly dairy cattle, which accomplishes the objects initially set out. While our method and apparatus have been devised particularly for dairy cattle, it is conceivable that the system may have beneficial usages for other purposes and we therefore desire to cover any use to which the system may be put. Regardless of end use, the system operates to withhold feed until a predetermined minimum quantity of water is first taken by the animal, and thereafter the quantity of feed offered is proportional to the volume of water consumed. This concept is thought to be entirely novel, is known to be beneficial in feeding dairy cattle, and is reasonably expected to be beneficial in feeding other farm and sporting animals. The system is practical because any animal quickly learns that it must drink a minimum quantity of water to get any feed at all. Animals are, by nature, rather rapid gulpers and will remain at the water source until their craving for and essential need for water is satisfied before proceeding to the feed bin.

The above specifically described embodiment of the invention should be taken as illustrative only as obviously very many changes may be made in the apparatus set-up without departing from the spirit or scope of our invention. Reference should therefore be had to the appended claims in determining the scope of the invention.

We claim:
1. A feeding and watering station for animals comprising
   (a) an open-topped feed box and an open-topped water container adapted to be mounted in side-by-side relation for ready access by the animals,
   (b) means to supply water to said container at a uniform rate,
   (c) means to supply granulous feed to said box at a uniform rate,
   (d) means to interrupt said means to supply water when the water in said container reaches a predetermined elevation, and
   (e) means to actuate said means to supply feed synchonously in time with the supplying of water to said container whereby the amount of feed dispensed is proportional to the amount of water consumed by an animal.
2. Apparatus according to claim 1 further including
   (f) means to delay the initiation of operation of said means to supply water until the water level in said container has dropped a predetermined distance below said elevation.
3. Apparatus according to claim 1 further including
   (g) means to adjustably delay as to time the actuation of said means to supply feed after the initiation of operation of said means to supply water.
4. Apparatus according to claim 2 further including
   (g) means to adjustably delay as to time the actuation of said means to supply feed after the initiation of operation of said means to supply water.
5. A feeding and watering station for animals comprising
   (a) an open-topped feed box and an open-topped water container adapted to be mounted in side-by-side relation for ready access by the animals,
   (h) means to automatically supply water to said container and to normally maintain a predetermined level therein,
   (i) means to automatically supply granulous feed to said box proportional in amount to the quantity of water furnished said container, and
   (j) means to delay the initiation of operation of said means to supply feed until a predetermined minimum quantity of water below said level has been consumed by an animal standing at said container.
6. Apparatus according to claim 5 further including
   (k) means to delay the operation of said means (i) whereby a predetermined portion of the quantity of water consumed by an animal is removed from the feedwater quantity ratio otherwise normally maintained.
7. A feeding and watering station for animals comprising
   (a) an open-topped feed box and an open-topped water container adapted to be mounted in side-by-side relation for ready access by the animals,
   (l) a float-type liquid-level control in said container,
   (m) a water reservoir positioned below said container and including means to receive water from a suitable source as well as means to maintain the level of water therein at a substantially fixed elevation,
   (n) an electric pump operating under said control to transfer water from said reservoir to said container,
   (o) a feeder driven by an electric motor for supplying granulous feed at a predetermined rate to said feed box, and
   (p) energizing means to actuate said motor synchronously in time with said pump.
8. Apparatus according to claim 7 wherein said float-type control is provided with
   (q) a lost-motion switch whereby said pump remains deenergized until the level of liquid in said container drops a predetermined distance after which said pump remains energized until the water level in said container is restored to its initial normal elevation.

9. The method of feeding animals wherein adjacent sources of granulous feed and water is provided for the animals comprising the steps of
(1) withholding feed from said feed source until a predetermined minimum initial quantity of water is consumed by an animal, and
(2) thereafter continuously supplying water to said water source to make up for the total quantity of water consumed by the animal
(3) while simultaneously metering out to the feed source a quantity of feed proportional to the quantity of water consumed by the animal.

10. The method of controlling the feeding of granulous concentrated nutrients to animals comprising the steps of
(4) providing a source of drinking water for the animal adjacent to the animals' feed box,
(5) withholding feed from said box until the animal has consumed a predetermined quantity of water from said source,
(6) thereafter continuously supplying water to said source to give the animal its fill and to restore said source back to its initial normal condition, and
(7) simultaneously metering feed to said box in a total amount proportional to the total amount of water consumed by the animal.

References Cited in the file of this patent
UNITED STATES PATENTS

| | | |
|---|---|---|
| 1,112,918 | Kuxmann et al. | Oct. 6, 1914 |
| 2,570,694 | Langenbahn | Oct. 9, 1951 |
| 2,661,122 | Peterson | Dec. 1, 1953 |
| 2,782,760 | Wolfe | Feb. 26, 1957 |
| 2,886,000 | Clegg | May 12, 1959 |